Patented Mar. 17, 1953

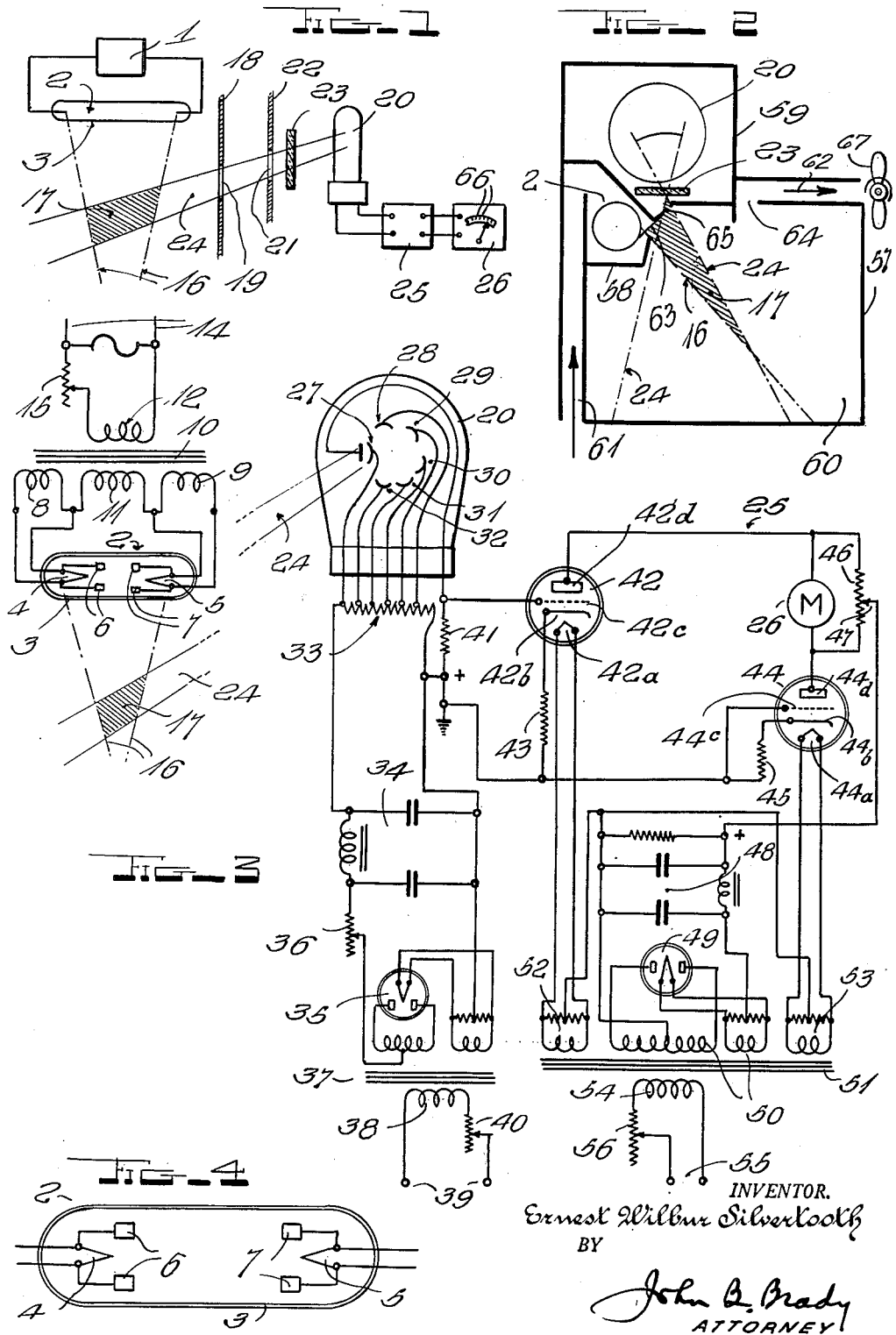

2,632,114

UNITED STATES PATENT OFFICE 2,632,114

APPARATUS FOR INDICATING HUMIDITY OF GASES AND THE ATMOSPHERE

Ernest Wilbur Silvertooth, Pasadena, Calif., assignor to Mega Corporation, Los Angeles, Calif., a corporation of California Application July 2, 1948, Serial No. 36,764

6 Claims. (Cl. 250—43.5)

My invention relates broadly to a method and apparatus for indicating conditions of humidity, and more particularly to an improved and simplified method and apparatus for measuring humidity.

One of the objects of my invention is to provide an improved highly sensitive method and apparatus for measuring absolute humidity.

Still another object of my invention is to provide an electrical system for directly and rapidly indicating conditions of humidity.

Still another object of my invention is to provide a light ray system for indicating and measuring relative conditions of humidity.

Other and further objects of my invention reside in an improved and simplified method and apparatus for measuring humidity conditions as set forth more fully in the specification hereinafter following by reference to the accompanying drawings, in which:

Figure 1 schematically illustrates the manner of radiating light rays into an area in which the humidity is to be determined; Fig. 2 schematically illustrates one form of my invention embodied in a cabinet structure through which the gases or atmosphere are positively circulated in determining the humidity thereof; Fig. 3 is a diagrammatic view of the light ray and electrical circuit arrangement of one form of measuring and indicating apparatus employed in the system of my invention; and, Fig. 4 is an enlarged view of the light source employed in the system of my invention.

My invention is directed to a simplified and highly sensitive system for measuring and indicating humidity of gases including the atmosphere.

I provide a method and apparatus for directly measuring and indicating the humidity of gases or the atmosphere rapidly and accurately.

A linear indication is obtained on a direct reading meter from 0% to 100% humidity with extension, if necessary, into the supersaturated state. The system of my invention employs simple calibration adjustments and is independent of non-adjustable aging properties and is adaptable to remote indication. This latter feature of my invention is highly important as the invention is applicable to sounding operations using free balloons. Rapid and accurate measurement of humidity is one of the factors so necessary in dealing with flying missile warfare and electromagnetic wave propagation phenomena.

My invention employs a generator of light having the properties of exciting fluorescence in water vapor by ultraviolet light radiation. Such fluorescence which occurs in the presence of water vapor is detected by a highly sensitive photoelectric cell system selected for its high sensitivity extending from the blue to beyond the 2537 angstrom line in the ultraviolet region. The fluorescent spectrum extends from this line toward the blue with considerable radiation at 3000 angstrom. The photoelectric cell sensitive to the fluorescent condition which occurs when ultraviolet radiation is subjected to the presence of water vapor controls an electronic system which in turn controls the measuring instrument calibrated to directly indicate conditions of humidity for the gases or the atmosphere in which the apparatus is used.

Referring to the drawings in more detail reference character 1 designates a power source for energizing the light source 2. The light source 2 comprises a cylindrical quartz envelope shown more clearly in Fig. 4 at 3 which includes hot cathodes 4 and 5 in opposite ends thereof. The hot cathodes 4 and 5 each have pairs of spaced electrodes at diametrically opposite sides thereof, one pair of which is represented at 6, and the other pair of which is represented at 7. These electrodes 6 and 7 connect to opposite legs of the respective cathodes 4 and 5 and are aligned longitudinally with each other in spaced relation as shown. The hot cathodes 4 and 5 are energized from the secondary windings 8 and 9 of the transformer system 10. Secondary windings 8 and 9 are arranged on opposite sides of secondary winding 11 which impresses alternating current across the oppositely disposed hot cathodes 4 and 5. Secondary windings 8 and 9 are both connected at one end with secondary winding 11, thus providing a symmetrical circuit arrangement for the light source. The respective cathodes 4 and 5 are always heated but the set of electrodes 6 act only as an anode when the set of electrodes 7 are negative. Similarly, the set of electrodes 7 serve as an anode system when the set of electrodes 6 are negative. Hence the discharge path through quartz envelope 3 alternates from left to right and right to left. Energy is delivered to the secondary windings 8, 9 and 11 from primary winding 12 connected to the alternating current power circuit represented at 14. It will be observed that a regulator or variable rheostat 15 is disposed in series between the power source 14 and the primary winding 12. This regulation is very important in adjusting the humidity indicating and measuring system for precise operation.

The radiation from the light source thus described is directed in a converging beam of ultraviolet radiation represented at 16 through the area in which the gases or the atmosphere, whose humidity condition is to be determined, passes. The presence of water vapor in the ultraviolet radiation thus produced, produces a fluorescence in the converging beam 16 as represented at 17.

The quartz envelope of the light source has relative dimensions in one embodiment of my invention of approximately one-half inch in diameter and three inches in length. A small trace of mercury is introduced within the envelope 3 containing argon gas before the quartz lamp is sealed off at approximately 5 mm. pressure for argon gas. Such a source emits a preponderance of its radiation in the 2537 angstrom mercury line.

The fluorescence produced in the water vapor-laden gas or atmosphere at 17 is detected as represented schematically at Fig. 1.

The radiation from the light source is substantially shielded with respect to the detector by means of the light baffle 18 containing the narrow aperture 19 with which there is angularly aligned the secondary emission multiplier photoelectric cell 20 through the light limiting slit 21 in the baffle member 22 with the filter 23 interposed in the path of the light rays 24 emanating from the fluorescence in the area 17 established by the effect of the ultraviolet radiation 16 on the moisture-laden gas or atmosphere. I have successfully employed as the detector 20 an RCA type 1P28 secondary emission multiplier photoelectric cell selected for its high sensitivity extending from the blue to beyond the 2537 angstrom line in the ultraviolet region. The photoelectric cell is excited from a high voltage source represented more particularly in Fig. 3. The output of the photoelectric cell is connected through multiplier system 25 to the calibrated meter 26. I have successfully employed an RCA volt ohmist vacuum tube volt meter connected to the amplifier output as shown.

In Fig. 3 I have schematically shown the photoelectric cell secondary emission multiplier tube 20 as including the light sensitive electrodes 27 and the associated secondary emission multiplier electrodes 28, 29, 30, 31 and 32 connected to spaced taps distributed along the resistance 33 as shown. The resistance 33 connects across the output of the filter system 34 which connects across the output of the full wave rectifier system 35 with the adjustable resistance 36 interposed between the filter system and the rectifier system. The high voltage transformer 37 has its secondary windings connected to the high voltage rectifier system 35 and its secondary winding 38 connected to the power source of alternating current at terminals 39 through adjustable resistance 40. The adjustable resistances 40 and 36 permit the application of the correct voltages to the circuits of the photoelectric cell. The output of the electron multiplier photoelectric cell is connected across the impedance 41 which connects to the input of the balanced amplifier system represented by electron tube 42. Electron tube 42 includes heater 42a, cathode 42b, control grid 42c and anode 42d. The input circuit extends from control grid 42c through impedance 41 returning to cathode 42b through resistance 43. The output circuit extending from anode 42d connects to meter 26 in series with control tube 44 which includes heater 44a, cathode 44b, control grid 44c and anode 44d. In the particular circuit shown grid 44c is connected in shunt with cathode 44b through resistor 45 and the shunted connection connected to the cathode side of the output circuit of amplifier tube 42. The anode 44d connects to the circuit of meter 26. Meter 26 is provided with a shunt 46 in parallel thereto, with an adjustable tap 47 thereon, connected to the positive terminal of the filter system 48. The filter system 48 is energized from full wave high voltage rectifier 49, the circuits of which are excited from secondary windings 50 of transformer system 51. Separate secondary windings 52 and 53 are arranged on the transformer 51 for energizing heater electrodes 42a and 44a, respectively. The transformer 51 is provided with a primary winding 54 which connects to the terminals 55 of an alternating current power source through the adjustable resistor 56. By virtue of the several adjustable means 56, 40 and 36, the required potential for operating the measuring system at maximum sensitivity and efficiency may be obtained.

Fig. 2 schematically represents one of the embodiments of my invention in which the components of the measuring system are enclosed within a cabinet structure represented at 57. The cabinet structure 57 is divided into three compartments, including a light source compartment 58, a photoelectric cell compartment 59, and a lighted area compartment 60, with a passage extending through the compartments from an input position represented at 61 to an output position represented at 62. The passageway formed between the input position 61 and the output position 62 extends through the light source compartment and around the light source 2 therein and through aperture 63 formed in partition 58 into the lighted area compartment 60 from which the gas or atmosphere is withdrawn through exit opening 64 leading to the output position 62. A force fan blower may be interposed in the path of the gas or atmosphere in its movement from the input position 61 to the output position 62. Forced circulation through a restricted passage may modify the moisture content of the air. The blower may be located at the output position 62 as represented at 67 for drawing air through the interconnected compartments or the fan may be located at the input position for forcing air through the compartments. Whether or not the force draft is established by a suction or pressure force, the gas or atmosphere passes around the light source 2 and through the aperture 63 in the light source compartment 58 and into the lighted area compartment 60 and through the exit port 64 and out of the discharge port 62. The cabinet structure is light-tight, so that measurements are readily made in daylight surroundings. The interior walls of the lighted area compartment and the interior walls of the passages 61 and 62 leading to and extending therefrom as well as the interior walls of the light source compartment 58 and the photoelectric cell compartment 59 all have a blackened interior. Suitable baffles may be arranged in passages 61 and 62 to obstruct the passages of exterior light into the lighted area 60 of the cabinet structure. Because the light source 2 may emit some visible light to which photoelectric cell 20 might be sensitive the filter 23 is interposed between light aperture 65 in the photoelectric cell compartment 59 and the photoelectric cell 20 to limit the effects of fluorescence induced in the gases or atmosphere in lighted area 60 to ultraviolet radiations. To improve the accuracy of readings I may introduce an airtrap adjacent the input position 61 including liquid air through which the gases or atmosphere must pass. Also, I may provide heating elements adjacent the light source 2 for compensating for any tendency of condensation of the gas or atmospheric gas stream on the side walls 3 of the light source 2.

The light source 2 projects ultraviolet radiations through aperture 63 along the path 16. A fluorescence is produced in the zone 17 in the gas or atmosphere confined in compartment 60 and the fluorescence directly effects photoelectric cell 20 through aperture 65 and filter 23.

The meter 26 has a calibrated scale 66 with graduations thereon which are correlated with humidity readings. Calibration for humidity conditions may be carried out in a variety of ways such as calibration with a controlled atmosphere and by other methods. A controlled atmosphere is one where a known humidity is added to dry air. The reason for this is because a much more accurate method of calibration is required than the hair hygrometer procedure for a good calibration. The calibrated scale 66 on meter 26 is checked for accuracy by readings of 100% humidity values in grams of water vapor per cubic meter as a function of the temperature established over the years in readily available published tables. These values are multiplied by the percentage of relative humidity as indicated by recorder readings for deriving an estimate of the moisture content of the atmosphere. This value was plotted against meter readings and an excellent straight line correlation obtained. The range of values secured under atmospheric conditions at the time ranged from a moisture content of from 9.5 to 13.3 grams per cubic meter and meter reading from 6.1 to 8.1 volts. Interpolating this plot to zero moisture content indicated a value of 1.1 volts. The 1.1 volts represents the amount of scattered light in the lighted area 60 finding its way into the photocell. An accurate checking of calibrations has enabled the meter 26 to be used as a direct reading instrument for indicating absolute humidity merely by passing a sample of the atmosphere through the cabinet structure represented in Fig. 2. No reference to charts is required and humidity values read directly from the scale 66. The sensitivity is of the order of a tenth of one percent of useful scale values.

To calibrate for a given percentage of water vapor or humidity, the space normally used for the fluorescence to take place, I insert a material with known transmission by this substitution of a material, such as glass, plastics or a partial reflector for maximum and minimum calibration points. Such a procedure does not require a controlled atmosphere.

The method of my invention can also be used for servo control of the atmosphere in a certain space (room, factory, etc.), The method then acts upon a servo system which may control a water spray, a freezing unit, a heating unit, and the like, in order to bring the particular chosen space mentioned hereinbefore to a desired fixed humidity and temperature condition.

While I have shown and described a light source 2 constituted by a hot mercury vapor tube I desire that it be understood that I may employ a cold mercury vapor tube. The important consideration is that the light source be rich in ultraviolet radiation that is rendered fluorescent by the presence of moist vapor.

I have found the humidity measuring instrument of my invention highly practicable and successful in operation and while I have described my invention in certain of its preferred embodiments, I realize that modifications may be made and I intend no limitations upon my invention other than may be imposed by the scope of the appended claims.

What I claim and desire to secure by Letters Patent of the United States is as follows:

1. Apparatus for indicating conditions of humidity of fluent material, comprising a light confining cabinet having input and output passages extending in directions substantially normal to each other with a confined area included therebetween, a light source for producing ultraviolet radiation within said confined area, a light sensitive device exposed to the fluorescence produced in said confined area by the effect of moisture in the fluent material passing through the ultraviolet radiation in said area through a zone in which the incoming fluent material is changing its directon of flow for discharge through said discharge passage, means for force flowing the fluent material through said confined area from said input to said output passages, and means for measuring the response of said light sensitive device to said fluorescence.

2. Apparatus for indicating conditions of humidity of fluent material, comprising a light confining cabinet having input and output passages extending in directions substantially normal to each other with a confined area included therebetween, a partition member in said cabinet, a light source on one side of said partition for producing ultraviolet radiation within said confined area, a light sensitive device on the other side of said partition, both said light source and said light sensitive device being disposed in paths extending into the area confined by said cabinet, said light sensitive device being exposed to the fluorescence produced in said area by the effect of moisture in the fluent material passing through the ultraviolet radiation in said area, means for measuring the response of said light sensitive device to said fluorescence, and means for force flowing fluent material continuously through said ultraviolet radiation from said input to said output passages for obtaining an integrated reading of the humidity conditions existing in said fluent material.

3. Apparatus for indicating conditions of humidity of fluent material, comprising a light confining cabinet including a light source compartment, a lighted area compartment and a photoelectric cell compartment, an intake passage for fluent material, a discharge passage for fluent material, a path interconnecting said intake passage and said discharge passage leading through said lighted area compartment, means for excluding external light from said compartments, means in said light source compartment for propagating ultraviolet radiations into said lighted area compartment, means for force flowing the fluent material from said intake passage to said discharge passage through said lighted area compartment, said intake passage directing fluent material into said lighted area compartment in a direction at a wide angle with respect to the direction of exit of the fluent material from said lighted area compartment into said discharge passage, and means in said photoelectric cell compartment responsive to the effects of fluorescence resulting from moisture carried by the fluent material in the course of passage thereof through said lighted area compartment.

4. Apparatus for indicating conditions of humidity of fluent material, comprising a light confining cabinet including a light source compartment, a lighted area compartment and a photoelectric cell compartment, an intake passage for fluent material, a discharge passage for fluent material, a path interconnecting said intake passage and said discharge passage leading through said lighted area compartment, means in said path for force flowing fluent material from said intake passage through said lighted area compartment and through said discharge passage, said intake passage directing fluent material into said lighted area compartment in a direction which intersects the direction of exit of said fluent material from said lighted area compartment into said discharge passage, means for excluding external light from said compartment, means in said light source compartment for propagating ultraviolet radiations into said light area compartment, means in said photoelectric cell compartment responsive to the effects of fluorescence resulting from moisture carried by the fluent material in the course of passage thereof through said lighted area compartment, and means in said photoelectric cell compartment for shielding said last-mentioned means from effects of said light source other than ultraviolet radiations.

5. Apparatus for indicating conditions of humidity of fluent material, comprising a light confining cabinet including a light source compartment, a lighted area compartment, and a photoelectric cell compartment, an intake passage for fluent material, a discharge passage for fluent material, a path interconnecting said intake passage and said discharge passage leading through said lighted area compartment, means in said path for force flowing fluent material from said intake passage through said lighted area compartment and through said discharge passage, said discharge passage extending in a direction substantially normal to the direction of said intake passage, means for excluding external light from said compartments, means in said light source compartment for propagating ultraviolet radiations into said lighted area compartment, light sensitive means in said photoelectric cell compartment responsive to the effects of fluorescence resulting from moisture carried by the fluent material in the course of passage thereof through said lighted area compartment, light opaque means extending between said light source compartment and said photoelectric cell compartment and separate means extending at angles to the last mentioned means for shielding said light sensitive means from direct effects of said light source and confining the operation thereof to the ultraviolet effects in the confined area of said lighted area compartment.

6. Apparatus for indicating conditions of humidity of fluent material, comprising a light confining cabinet having input and output passages extending in directions substantially normal to each other with a confined area included therebetween, a pair of compartments located in one corner of said cabinet, one of said compartments being disposed in a series path in said input passage and the other of said compartments being arranged immediately adjacent said output passage and both of said compartments opening into said confined area in said light confining cabinet, a light source in said first mentioned compartment, a light sensitive device in said last mentioned compartment and exposed to the fluorescence produced in said confined area by the effect of moisture in the fluent material passing through the ultraviolet radiation in said confined area through a zone in which the confining fluent material is changing its direction of flow adjacent the corner of said cabinet in which said pair of compartments are located, means for force flowing the fluent material each through said confined area from said input to said output passages, and means for measuring the response of said light sensitive device to said fluorescence.

ERNEST W. SILVERTOOTH.

REFERENCES CITED

The following references are of record in the file of this patent:

UNITED STATES PATENTS

| Number | Name | Date |
|---|---|---|
| 2,206,922 | Smith | July 9, 1940 |
| 2,263,108 | Stuart | Nov. 18, 1941 |
| 2,311,151 | Campbell | Feb. 16, 1943 |
| 2,337,465 | Heigl | Dec. 21, 1943 |
| 2,369,966 | Hawkins | Feb. 20, 1945 |
| 2,381,414 | Wilkie | Aug. 7, 1945 |

OTHER REFERENCES

Fluorochemistry, De Ment, 1945, Chemical Publishing Company Inc., Brooklyn, New York, p. 540.